(12) United States Patent
Lim et al.

(10) Patent No.: US 7,187,825 B2
(45) Date of Patent: Mar. 6, 2007

(54) SYSTEM AND METHOD FOR EXTENDING VIEWING ANGLE OF LIGHT EMITTED FROM LIGHT PIPE

(75) Inventors: Hui-Leng Lim, Newark, CA (US); Igor Vinogradov, Bay Shore, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 224 days.

(21) Appl. No.: 10/738,163

(22) Filed: Dec. 17, 2003

(65) Prior Publication Data

US 2005/0135741 A1    Jun. 23, 2005

(51) Int. Cl.
*G02B 6/26* (2006.01)
(52) U.S. Cl. .......................................... 385/31; 385/15
(58) Field of Classification Search ................ 385/15, 385/31
See application file for complete search history.

(56) References Cited

U.S. PATENT DOCUMENTS 5,438,485 A * 8/1995 Li et al. ...................... 362/558
5,857,759 A * 1/1999 Latta et al. ................. 362/560
6,266,476 B1 * 7/2001 Shie et al. ................... 385/147

FOREIGN PATENT DOCUMENTS

JP          21223 A  *  1/2000

* cited by examiner

*Primary Examiner*—Jennifer Doan
(74) *Attorney, Agent, or Firm*—Fay Kaplun & Marcin, LLP

(57) ABSTRACT

Described is a system with a light pipe body having a first end and a second end, wherein a light source provides light beams at a first end of the light pipe body, the light beams traveling through the light pipe body. The system further includes a light-emitting surface coupled to the second end of the light pipe body, wherein the light beams travel from the light pipe body to the light-emitting surface. The system also has dispersion structures disposed on a surface of the light-emitting surface, wherein the dispersion structures are protrusions from the surface of the light-emitting surface, the light beams traveling from the light-emitting surface to the dispersion structures and being emitted from the dispersion structures at a plurality of angles.

20 Claims, 5 Drawing Sheets

SYSTEM AND METHOD FOR EXTENDING VIEWING ANGLE OF LIGHT EMITTED FROM LIGHT PIPE

BACKGROUND

Light-pipes (e.g., fiber optic cable) are used when light needs to be brought from a source to another location where it can be seen or used. In cases where the function of the light emitted is to provide some form of visual indication to the user, most light-pipe designs do not provide adequate dispersion of light to allow the user to see the light in wider angles than looking directly at the source. This is especially true when these light indicators are used on mounted devices such as networking equipment where the light needs to be observed from some distance at all angles. There have been some designs which create a better light dispersion by covering the emitting surface with a thin opaque scattering layer. However, these designs create a dimming effect which is undesirable. A manner of dispersing the light without sacrificing the light intensity is desired.

SUMMARY OF THE INVENTION

A system with a light pipe body having a first end and a second end, wherein a light source provides light beams at a first end of the light pipe body, the light beams traveling through the light pipe body. The system further includes a light-emitting surface coupled to the second end of the light pipe body, wherein the light beams travel from the light pipe body to the light-emitting surface. The system also has dispersion structures disposed on a surface of the light-emitting surface, wherein the dispersion structures are protrusions from the surface of the light-emitting surface, the light beams traveling from the light-emitting surface to the dispersion structures and being emitted from the dispersion structures at a plurality of angles.

In addition, a method for dispersing light beams over a range of angles, comprising the steps of receiving light beams into a body of a light pipe and transmitting the light beams through the body of the light pipe to a light-emitting surface of the light pipe and transmitting the light beams into dispersion structures disposed on a surface of the light-emitting surface. The method further emits a first portion of the light beams from the dispersion structures, wherein the first portion of light beams are emitted upon first contact with an emission surface of the dispersion structures, the first portion of light beams being refracted when emitted and emits a second portion of the light beams from the dispersion structures, wherein the second portion of light beams are internally reflected upon first contact with the emission surface and emitted upon subsequent contact with the emission surface.

A dispersion structure, comprising a protrusion disposed on a light-emitting surface, wherein light beams enter the dispersion structure, a first portion of the light beams being emitted upon first contact with an emission surface of the dispersion structures and a second portion of the light beams being internally reflected upon first contact with the emission surface and emitted upon subsequent contact with the emission surface, the first and second portions of the light beams being emitted over a plurality of angles.

DETAILED DESCRIPTION

Figure 1:
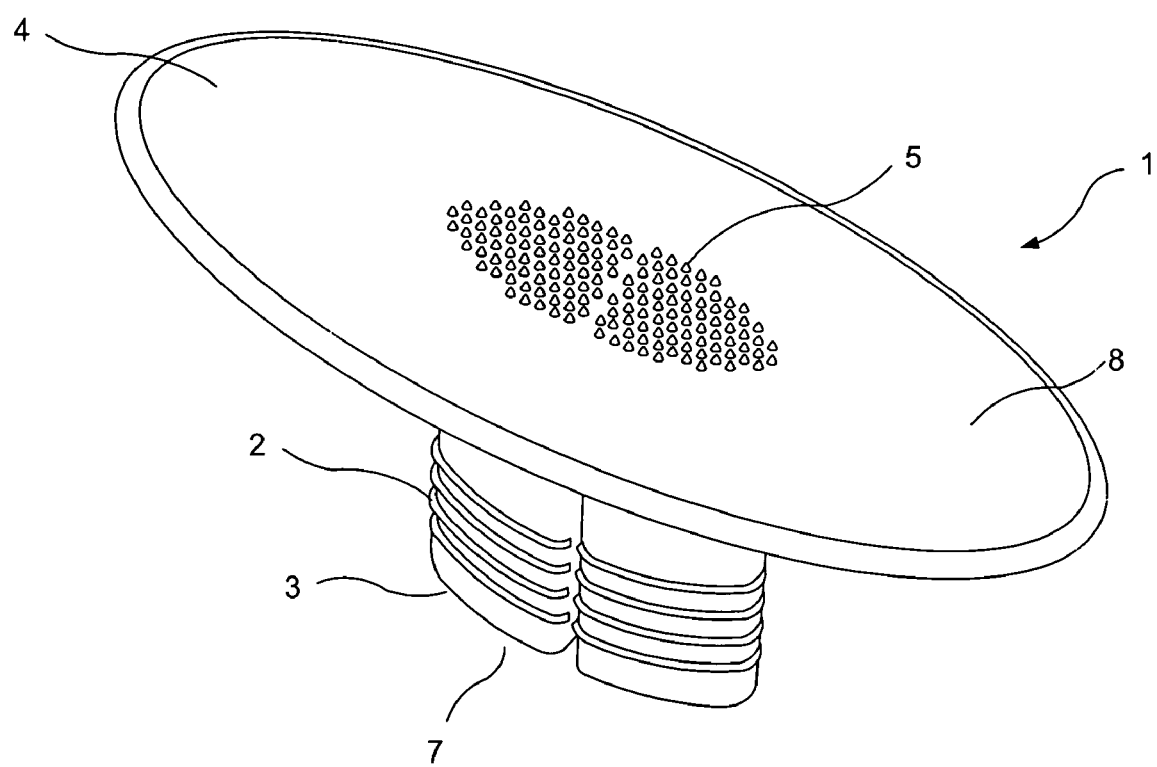
FIG. 1 illustrates an exemplary embodiment of a light pipe having exemplary dispersion structures added to a light-emitting surface according to the present invention.

The exemplary embodiment of the present invention describes dispersion structures which may be added to the light-emitting surface of a light pipe to increase the light dispersion of the light pipe. FIG. 1 illustrates an exemplary light pipe 1 having the exemplary dispersion structures 5 added to the light-emitting surface 8. In this example, the light pipe 1 has a generally cylindrical body 2 with a first end 3 receiving light from a light source 7. Those of skill in the art will understand that the light source 7 is generally a separate device which generates the light to be carried through the light pipe 1, but it may be included as a portion of the light pipe 1.

At a second end 4 of the light pipe 1, a light-emitting surface 8 is provided. In this exemplary embodiment, the light-emitting surface has a substantially disc shape, but it may be any other shape. The light travels through the light pipe 1 and is dispersed to users by the light-emitting surface 8. In this example, the light-emitting surface 8 includes additional dispersion structures 5 which aid in the dispersion of the light to the users. The dispersion structures 5 provide for a larger field of view for the light than if the light-emitting surface 8 were flat. In addition, the dispersion structures 5 do not significantly reduce the intensity of the light traveling through the light pipe 1.

Figure 2:
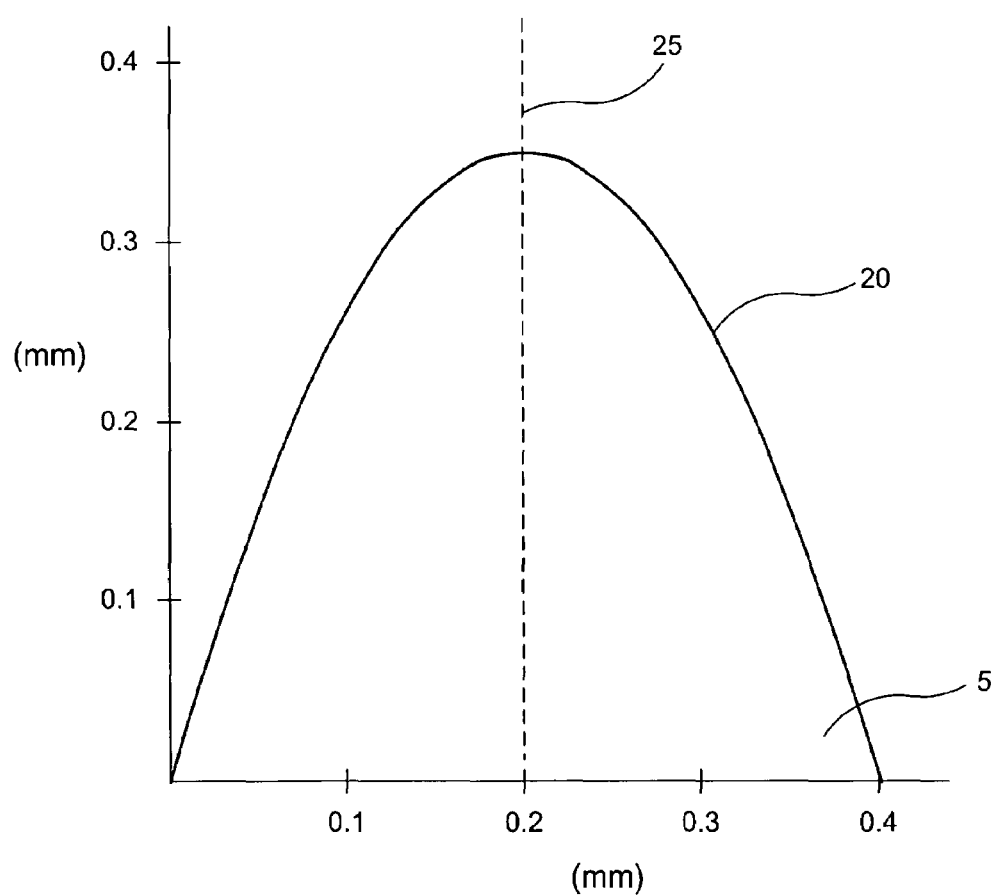
FIG. 2 shows an exemplary cross-section of one of the dispersion structures according to the present invention.

The dispersion structures 5 are protrusions on the surface of the light-emitting surface 8 and may have a variety of shapes. The shape of the dispersion structures may be any free form shape or structure which disperse the light as described in this description, e.g., substantially sinusoidal, parabolic or conic cross-sectional profile. FIG. 2 shows an exemplary cross-section 20 of one of the dispersion structures 5. In this example, the cross-section 20 of the dispersion structure 5 is parabolic in shape and has the dimensions as shown in FIG. 2. Those of skill in the art will understand that the parabolic shape and the dimensions are only exemplary. As the function and the operation of the dispersion structures 5 are described in more detail below, it will become apparent to those of skill in the art that dispersion structures 5 having other shapes may perform in the same manner as described for the exemplary dispersion structure having the parabolic cross-section 20. In addition, the size as shown in FIG. 2 is only exemplary and other sized dispersion structures may be used. Additional sizes may be determined based on a variety of factors such as the shape of the dispersion structures 5, the size of the light-emitting surface 8, the manufacturing and tooling tolerances for the light pipe 1, etc.

The example dispersion structure 5 having the parabolic cross-section 20 may be described using the following equation:

$$\{X,Y\}=\{x, 5*(\cos [x]-\cos [a])\}*\text{scale}$$

where:

$a=\Pi/4,$ $-a<x<a,$ and scale is a scaling factor

In the example shown in FIG. 2, the scaling factor is 0.25. Each of the dispersion structures 5 may be substantially rotationally symmetrical about its vertical centerline. Thus, in FIG. 2, the dispersion structure 5 is rotationally symmetrical about the vertical centerline 25.

Those of skill in the art will understand that the dispersion structures 5 are not required to be rotationally symmetrical, the shape may be any free form shape which produces the light dispersion described herein. Furthermore, there may some applications where the user may desire to view the light beams from a pre-determined direction. In this case, the dispersion structures may be formed to focus the light beams in this pre-determined direction.

Figure 3:
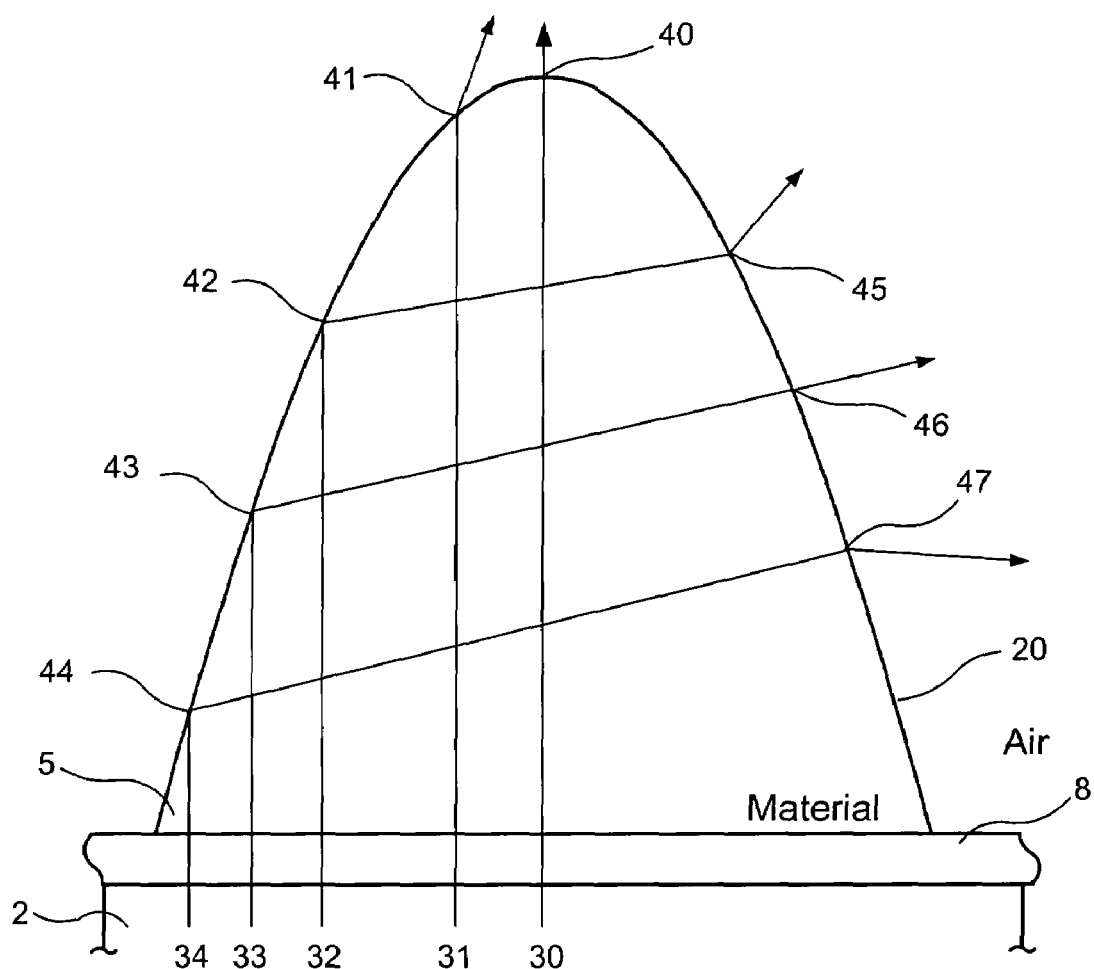
FIG. 3 is a second cross-sectional view of a dispersion structure having a parabolic shape and an exemplary light travel through the dispersion structure according to the present invention.

FIG. 3 is a second cross-sectional view of a dispersion structure 5 having a parabolic shape 20. In this example, the dispersion structure 5 is shown as being a protrusion on the surface of light-emitting surface 8 which is disposed at the end of the light pipe body 2. FIG. 3 also shows a series of light beams 30–34 which are traveling through the light pipe 1 to be dispersed by the light-emitting surface 8. In this example, the dispersion structure 5, the light-emitting surface 8 and the light pipe body 2 are made of a common material such as glass or plastic (e.g., polycarbonate, acrylic, etc.), while the light is to be dispersed into air. For the purposes of molding the light pipe, including the dispersion structure 5, the light-emitting surface 8 and the light pipe body 2, it may be advantageous for the light pipe to be made of a single material which has a refractive index greater than that of the medium into which the light is to be emitted.

Those of skill in the art will understand that it may also be possible for each of the dispersion structure 5, the light-emitting surface 8 and the light pipe body 2 to be made of different materials and for the dispersion to be into a material other than air. In general, the refraction index of the material will be less in the direction of the travel of the light beams 30–34. Thus, the refraction index of air is less than the refraction index of the material of the dispersion structure 5.

The following will describe the travel of each of the light beams 30–34 through the light pipe 1 (including the body 2, the light-emitting surface 8 and the dispersion structure 5). It should be noted that the light beams 30–34 are not drawn to accurately illustrate the angles of reflection and refraction of the light beams 30–34. The light beams 30–34 are only shown to illustrate the general direction of travel of the light beams through the dispersion structure 5. The light beam 30 is traveling through the body 2 in a direction that is perpendicular to the light-emitting surface 8 meaning that the light beam passes from the body 2 to the light-emitting surface 8 and through to a lower portion of the dispersion structure 5. Each of the remaining light beams 31–34 travel in this same manner to the lower portion of the dispersion structure and this will not be discussed for the remaining light beams 31–34.

The light beam 30 then travels through the dispersion structure 5 and hits the material-air boundary normal (perpendicular) to the surface of the dispersion structure 5 at point 40. The points 40–47 on the surface of the dispersion structure 5 may be referred to as points on the medium-air boundary or as a point on the emission surface of the dispersion structure 5. The emission surface should be understood to mean a surface of the dispersion structure from which a light beam may be emitted. A light beam which hits the material-air boundary such that it is normal to the surface of the dispersion structure 5, such as the light beam 30, is not bent and continues to travel in a straight line as shown in FIG. 3.

This is based on the principal that when light is incident upon a medium having a lesser index of refraction, the light beam is bent away from the normal so the exit angle is greater than the incident angle. This is governed by Snell's Law which can be expressed by the formula:

$$n_i * \sin \theta_i = n_t \sin \theta_t,$$

where, $n_i$=the refraction index of the material having the larger refraction index, $\theta_i$=the incident angle, $n_t$=the refraction index of the material having the smaller refraction index, and $\theta_t$=the exit angle.

Thus, in the case of a light beam which is normal to the surface of the dispersion structure 5, the incident angle is zero (0), meaning that the exit angle is zero (0), i.e., there is no refraction or bending of the light beam.

Continuing with the example, the light beam 31 travels through the dispersion structure 5 and encounters the medium-air boundary in the area near the top of the dispersion structure 5 at point 41. However, in this case, the light beam 31 is not normal to the surface of the dispersion structure 5. Thus, the light beam 31 is refracted according to the formula described above. As a result, the light beam 31 is dispersed at a different angle than it travels through the dispersion structure 5 as illustrated by FIG. 3.

Those of skill in the art will understand that a certain amount of the light energy of the light beam 31 will also be reflected back into the dispersion structure 5 and will exit the dispersion structure 5 consistent with the angle that this reflected light hits dispersion structure 5 surface. This reflection is not shown in FIG. 3 because, in general, this reflected light is much less than the light which is transmitted and refracted into the air. The case of total internal reflection will be described below.

Continuing with the example of FIG. 3, the light beam 32 travels through the dispersion structure 5 and first encounters the material-air boundary at point 42 on the surface of the dispersion structure 5. However, in the case of the light beam 32, the light does not exit the dispersion structure 5, but rather is reflected back into the dispersion structure 5. This is referred to as a total internal reflection. As described above, the light beam will behave according to the formula for refraction described above when traveling from a material having a higher refractive index to a material having a lower refractive index. According to the formula, the exit angle $\theta_r$ will approach 90° as the incident angle $\theta_i$ increases. However, at some critical angle $\theta_c$ of the incident angle, and for all angles greater than $\theta_c$, there will be total internal reflection, i.e., the light beam will be reflected back into the dispersion structure 5 rather than being dispersed into the air. The critical angle $\theta_c$ may be determined using Snell's Law (described above), setting the refraction angle (exit angle) to 90° and solving for the incident angle $\theta_i$.

Thus, the first encounter of the light beam 32 with the material-air boundary at point 42 of the dispersion structure 5 is at an incident angle greater than the critical angle causing total internal reflection of the light beam 32. The light beam 32 then continues to travel through the dispersion structure 5 after reflection and encounters the material-air boundary at point 45 on the surface of the dispersion structure 5. In this case, the light beam 32 hits the surface of dispersion structure 5 at an angle less than the critical angle and is refracted out into the air as illustrated in FIG. 3.

The light beams 33 and 34 behave in the same general manner as the light beam 32. In particular, the light beam 33 first encounters the material-air boundary at point 43. The incident angle is greater than the critical angle and the light beam 33 experiences total internal reflection and continues to travel through the dispersion structure 5 to the material-air boundary at point 46. In this example, the light beam 33 is normal to the surface of the dispersion structure 5 and the light beam is not bent (refracted) as it leaves the dispersion structure 5. The light beam 34 first encounters the material-air boundary at point 44. The incident angle is greater than the critical angle and the light beam 34 experiences total internal reflection and continues to travel through the dispersion structure 5 to the material-air boundary at point 47. The light beam 34 hits the surface of dispersion structure 5 at an angle less than the critical angle and is refracted out into the air.

In the above example, each of the light beams encountered the emission surface of the dispersion structure 5 either one or two times. Those of skill in the art will understand that a light beam may be totally internally reflected multiple times before it is emitted from the dispersion structure 5.

Figure 4:
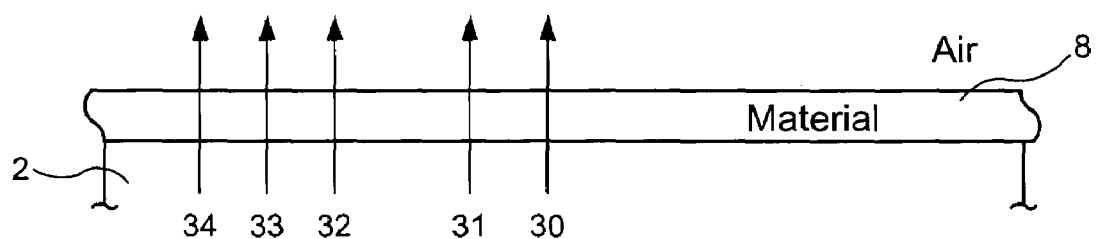
FIG. 4 shows an example of light beams traveling through a light pipe body and a light-emitting surface without the aid of a dispersion structure.

FIG. 4 shows an example of the same light beams 30–34 traveling through a light pipe body 2 and a light-emitting surface 8 without the aid of the dispersion structure 5. As shown in FIG. 4, each of the beams 30–34 travels perpendicular to the light-emitting surface 8 and encounter the material-air boundary normal to the light-emitting surface 8. Thus, as explained above, each of the light beams 30–34 are not refracted into the air, but remain on the same path. Thus, as can be seen from a comparison of FIGS. 3 and 4, the addition of the dispersion structure 5 allows for a greater angle of dispersion of light from the light pipe 1. Each of the light beams 30-34 in FIG. 4 exits at an angle which is perpendicular to the light-emitting surface, meaning that a user must essentially be looking directly along this perpendicular to see the light. However, as shown in FIG. 3, the light beams 30–34 exit at various angles with respect to the light-emitting surface 8. In this case, users may effectively receive the signal at various angles to the light-emitting surface 8.

Figure 5:
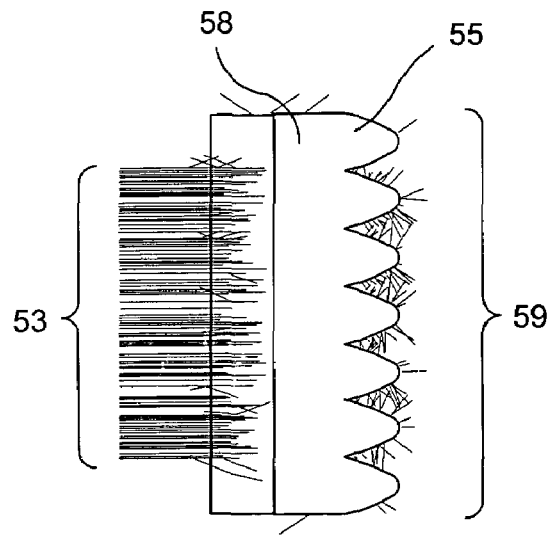
FIG. 5 shows an exemplary section view of a plurality of dispersion structures protruding from a light-emitting surface according to the present invention.

FIG. 5 shows an exemplary section view of a plurality of dispersion structures 55 protruding from a light-emitting surface 58. A plurality of light beams 53 are shown entering the light-emitting surface 58. The plurality of light beams travels through the light-emitting surface 58 and the plurality of dispersion structures 55 and emerges as the plurality of light beams 59 at the output of the dispersion structures 55. As shown previously for the single dispersion structure 5 in FIG. 3, the plurality of dispersion structures 55 take the plurality of incoming light beams 53 and disperse them over the large angle as shown by the outgoing plurality of light beams 59.

Figure 6:
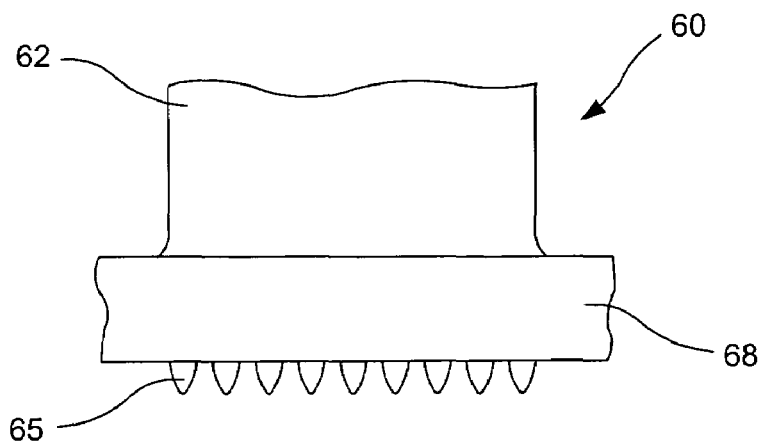
FIG. 6 shows a side view of a portion of a light pipe including a light pipe body, a light-emitting surface and a plurality of dispersion structures according to the present invention.

FIG. 6 shows a side view of a portion of a light pipe 60 including a light pipe body 62, a light-emitting surface 68 and a plurality of dispersion structures 65. This view shows the dispersion structures 65 protruding from the surface of the light-emitting surface 68.

Figure 7:
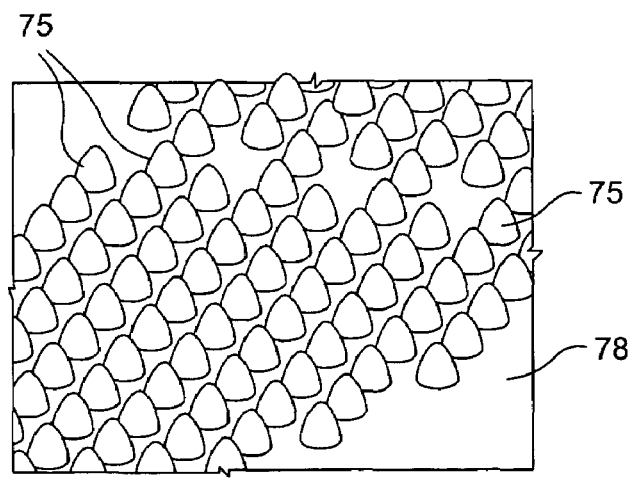
FIG. 7 shows a close-up view of a light-emitting surface having a plurality of dispersion structures along the surface according to the present invention.

FIG. 7 shows a close-up view of a light-emitting surface 78 having a plurality of dispersion structures 75 along the surface. The dispersion structures 75 may be arranged in any manner on the light-emitting surface 78. However, in general, the greater the density of dispersion structures 78, the more effective dispersion will occur (i.e., more dispersion structures mean more dispersion).

Figure 8:
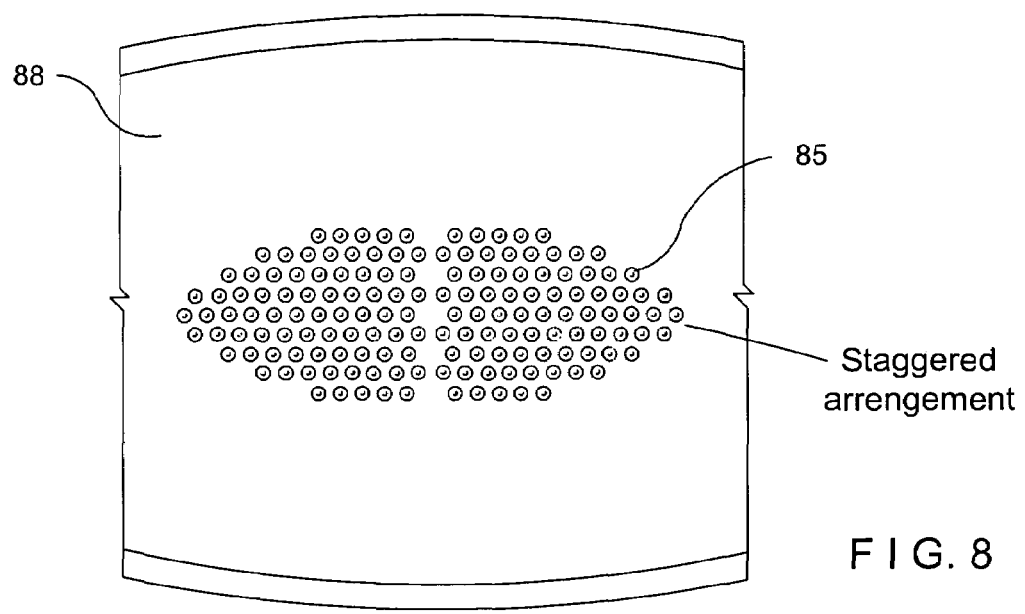
FIG. 8 shows an exemplary arrangement for dispersion structures along a light-emitting surface according to the present invention.

FIG. 8 shows an exemplary arrangement for dispersion structures 85 along a light-emitting surface 88. The arrangement of the dispersion structures 85 shown in FIG. 8 is a staggered arrangement which allows more structures 85 to be fit into the area of the light-emitting surface 88. Those of skill in the art will understand that the staggered arrangement is only exemplary and there may be other manners of arranging the dispersion structures to allow for a good dispersion of the light.

Figure 9:
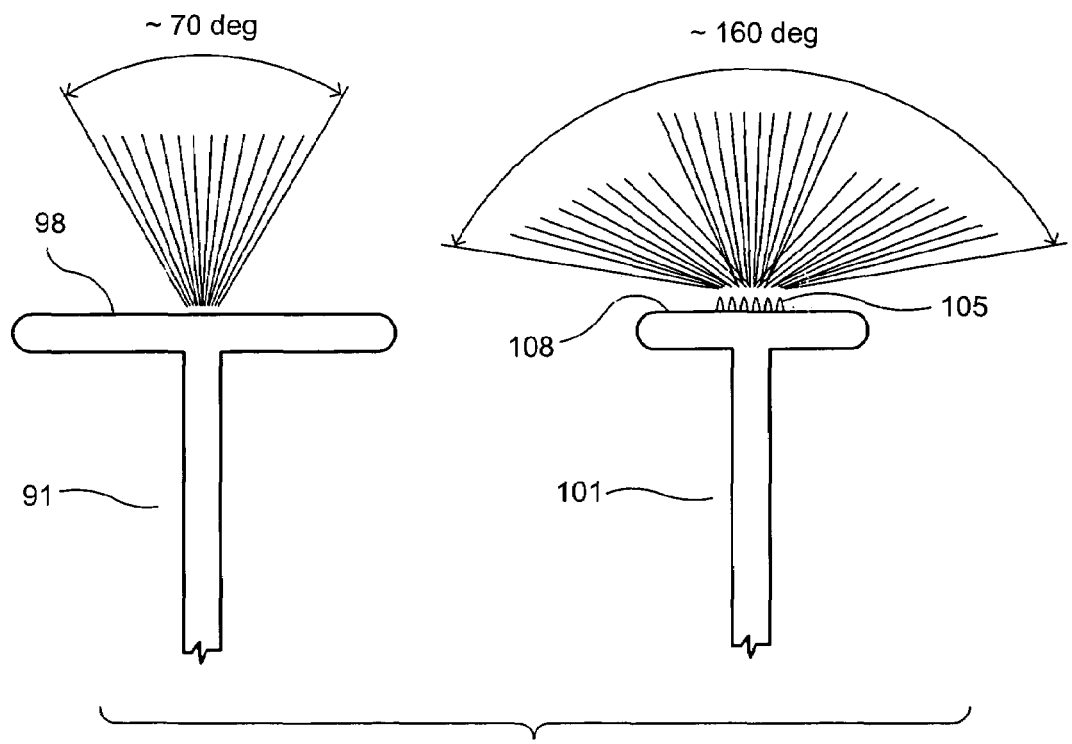
FIG. 9 shows an exemplary comparison of the field of view of a first light pipe without dispersion structures and a second light pipe having dispersion structures according to the present invention.

FIG. 9 shows an exemplary comparison of the field of view of a first light pipe 91 without dispersion structures and a second light pipe 101 having dispersion structures 105. As shown in FIG. 9, the light dispersion from the light-emitting surface 95 of the light pipe 91 without dispersion structures is along a very narrow field of view of approximately 70°. In the example of FIG. 4, the light traveling through the light pipe was shown as traveling substantially perpendicular to the light-emitting surface. However, in an actual light pipe, the light travels based on the principal of total internal reflection and generally reflects through the light pipe at various angles. Thus, when the actual light reaches the light-emitting surface 98 of the light pipe 91, it leaves the light-emitting surface at various angles resulting in the approximately 70° field of view shown.

In contrast, the light pipe 101 having the dispersion structures 105 on the light-emitting surface 108 has light dispersion over a wide field of view of approximately 160°. As described above, the light traveling through the light pipe 101 reflects in the same way. However, when the light reaches the light-emitting surface 108 at the various angles, the dispersion structures 105 are able to disperse the light over a larger viewing field. Those of skill in the art will understand that the approximately 160° viewing field is based on the particular dispersion structures 105 modeled in FIG. 9 and that it may be possible to have other dispersion structures which extend the viewing field up to a full 180°.

As described above, the dispersion structures may take on a variety of shapes. However, the radius of curvature of a parabolic or sinusoidal shape should not be too steep to cause reflection of the light back into the light pipe. It will be apparent to those of skill in the art the curvatures which are too steep based on the equations given above. Any shape which causes substantial reflection back into the light pipe should be avoided. In addition, it may be possible to have the dispersion structures have different surface finishes resulting in different dispersion characteristics, e.g., polished, textured, etc.

It will be apparent to those skilled in the art that various modifications and variations can be made in the dispersion structure and the methodology of the present invention, without departing from the spirit or scope of the invention. Thus, it is intended that the present invention cover the modifications and variations of this invention provided they come within the scope of the appended claims and their equivalents.

What is claimed is:

1. A system, comprising:
   a light pipe body having a first end and a second end, wherein a light source provides light beams at a first end of the light pipe body, the light beams traveling through the light pipe body;
   a light-emitting surface coupled to the second end of the light pipe body, wherein the light beams travel from the light pipe body to the light-emitting surface; and
   a plurality of dispersion structures formed as raised protrusions on a surface portion of the light-emitting surface, a remaining portion of the light emitting surface being substantially flat, the light beams traveling from the portion of the light-emitting surface to the dispersion structures and being emitted from the dispersion structures at a plurality of angles, the light beams being refracted when emitted from the dispersion structures.

2. The system according to claim 1, wherein a cross-section of the dispersion structures is substantially one of parabolic, conic and sinusoidal.

3. The system according to claim 1, wherein the dispersion structures are substantially rotationally symmetrical about a vertical centerline.

4. The system according to claim 1, wherein the light pipe body is comprised of one of glass, a polycarbonate and an acrylic.

5. The system according to claim 1, wherein the dispersion structures have a first index of refraction which is higher than a second index of refraction of a medium into which the light beams are emitted.

6. The system according to claim 5, wherein the medium is air.

7. The system according to claim 1, wherein one of the light beams arrives at a surface of one of the dispersion structures and is one of emitted without refraction, emitted with refraction and substantially internally reflected.

8. The system according to claim 1, wherein the plurality of angles includes angles greater than 160°.

9. The system according to claim 1, wherein substantially all of the light beams entering the dispersion structures are emitted.

10. The system according to claim 1, wherein a surface of one of the dispersion structures is one of polished and textured.

11. A method for dispersing light beams over a range of angles, comprising the steps of:
    receiving light beams into a body of a light pipe;
    transmitting the light beams through the body of the light pipe to a substantially flat light-emitting surface of the light pipe;
    further transmitting the light beams into dispersion structures formed as raised protrusions on a flat surface of the substantially flat light-emitting surface;
    emitting a first portion of the light beams from the dispersion structures, wherein the first portion of light bean are emitted upon first contact with an emission surface of the dispersion structures, the first portion of light beams being refracted when emitted; and
    emitting a second portion of the light beams from the dispersion structures, wherein the second portion of light beams are internally reflected upon first contact with the emission surface and emitted upon subsequent contact with the emission surface.

12. The method according to claim 11, further comprising the step of: generating the light beams.

13. The method according to claim 11, wherein a cross-section of the dispersion structures is substantially one of parabolic, conic and sinusoidal.

14. The method according to claim 11, wherein the dispersion structures have a first index of refraction which is greater than a second index of refraction of a medium into which the light beams are emitted.

15. The method according to claim 11, wherein a plurality of angles over which the first and second portion of the light beams are emitted includes one angle greater than 160°.

16. The method according to claim 11, wherein substantially all of the light beams entering the dispersion structures are emitted.

17. A dispersion structure, comprising:
    a light emitting surface including a plurality of protrusions protruding from a surface portion of the light-emitting surface, the light emitting surface further including a remaining surface portion being substantially flat, wherein light beams enter the dispersion structure, a first portion of the light beams being emitted upon first contact with an emission surface of the protrusions, the first portion of light beams being refracted when emitted from the protrusions, and a second portion of the light beams being internally reflected upon first contact with the emission surface and emitted upon subsequent contact with the emission surface, the first and second portions of the light beams being emitted over a plurality of angles.

18. The dispersion structure according to claim 17, wherein a cross-section of the dispersion structure is substantially one of parabolic, conic and sinusoidal.

19. The dispersion structure according to claim 17, wherein the plurality of angles includes one angle greater than 160°.

20. The dispersion structure according to claim 17, wherein the light beams are emitted in a pre-determined direction.

* * * * *